US005114446A

United States Patent [19]

Giersdorf et al.

[11] Patent Number: 5,114,446

[45] Date of Patent: May 19, 1992

[54] DEOILER FOR JET ENGINE

[75] Inventors: Rodney L. Giersdorf, Port St. Lucie; Alfred Peduzzi, Juno Isles; Allan D. Krul; Stephen R. Jones, both of Jupiter; Gregory E. Chetta, Palm Beach Gardens, all of Fla.

[73] Assignee: United Technologies Corporation, Hartford, Conn.

[21] Appl. No.: 656,381

[22] Filed: Feb. 15, 1991

[51] Int. Cl.[5] .............. B01D 45/14

[52] U.S. Cl. .............. 55/345; 55/438

[58] Field of Search .............. 55/1, 17, 342, 345, 55/348, 437–439

[56] References Cited

U.S. PATENT DOCUMENTS

| | | | |
|---|---|---|---|
| 1,554,726 | 9/1925 | Hoffman | 55/438 X |
| 2,336,477 | 12/1943 | Fulcher | 55/437 |
| 2,402,845 | 6/1946 | Rodman | 55/345 |
| 2,601,907 | 7/1952 | Burrows et al. | 55/439 X |
| 2,774,444 | 12/1956 | Soddy | 55/345 |
| 3,768,236 | 10/1973 | Rudge | 55/438 |
| 3,788,282 | 1/1974 | Modrak et al. | 55/348 X |
| 3,902,876 | 9/1975 | Moen et al. | 55/348 |
| 4,441,871 | 4/1984 | Boller | 55/437 X |
| 4,470,778 | 9/1984 | Mabe | 55/437 X |
| 4,627,861 | 12/1986 | Ibaraki et al. | 55/438 X |
| 4,832,709 | 5/1989 | Nagyszalanczy | 55/1 |
| 4,877,431 | 10/1989 | Avondoglio | 55/345 X |

*Primary Examiner*—Robert Spitzer

[57] ABSTRACT

A deoiler for a jet engine which separates oil droplets from an air/oil mixture in three stages, the first stage employing external radial extending vanes having a curved inducer, the second stage employing vanes which are laid over in the direction of rotation of the deoiler, the windows through which the air/oil mixture flows from the second stage to the third stage being contoured to provide a maximum path for oil droplets to the second stage bleed holes.

7 Claims, 4 Drawing Sheets

DEOILER FOR JET ENGINE

The invention was made under a U.S. Government contract and the Government has rights herein.

DESCRIPTION

This invention was made under a Government contract and the Government has rights therein.

1. Technical Field

This invention relates to jet engines for aircraft and more particularly to the separation of entrained oil in breather airflow before the air is vented overboard.

2. Background Art

In aircraft jet engines, pressurized air leaks through bearing compartment shaft seals. Since the bearing compartments contain oil for lubrication of bearings, a certain amount of the oil becomes entrained in the air and could be vented overboard with the air through a breather. This is not desirable particularly since the lubricating oil supply could become depleted if the oil is not separated from the air. There is also an environmental aspect with respect to the vented air and it is desirable to keep the vented air as clean as possible. It is necessary, therefore, to prevent excessive amounts of oil losses, and also to maintain a relatively low back pressure in the bearing compartments and thus reduce the pressure drop with respect to ambient air to improve bearing compartment sealing capabilities. Deoilers are used to separate the oil from the air before the air is vented overboard. Since engine weight is of prime importance, it is desirable to keep the weight and size of the engine oil system as small as possible.

DISCLOSURE OF THE INVENTION

It is an object of the invention to provide a deoiler for an aircraft jet engine which prevents excessive amounts of lubricating oil from being vented overboard with the breather air while maintaining a low back pressure.

It also is an object of the invention to provide an aircraft engine deoiler which works equally well in high airflow and low airflow engines, both military and commercial.

A further object of the invention is to provide an aircraft engine deoiler system which is compact, which has the advantages of larger, heavier systems and which effectively reduces oil usage.

BEST MODE FOR CARRYING OUT THE INVENTION

The gearbox of a jet engine typically operates at a lower pressure than the bearing compartments in the engine and is, therefore, a convenient collection point for breather air being vented from the bearing compartments. Because the gearbox drives several high-speed components, the deoiler can be mounted on one of these shafts.

Figure 1:
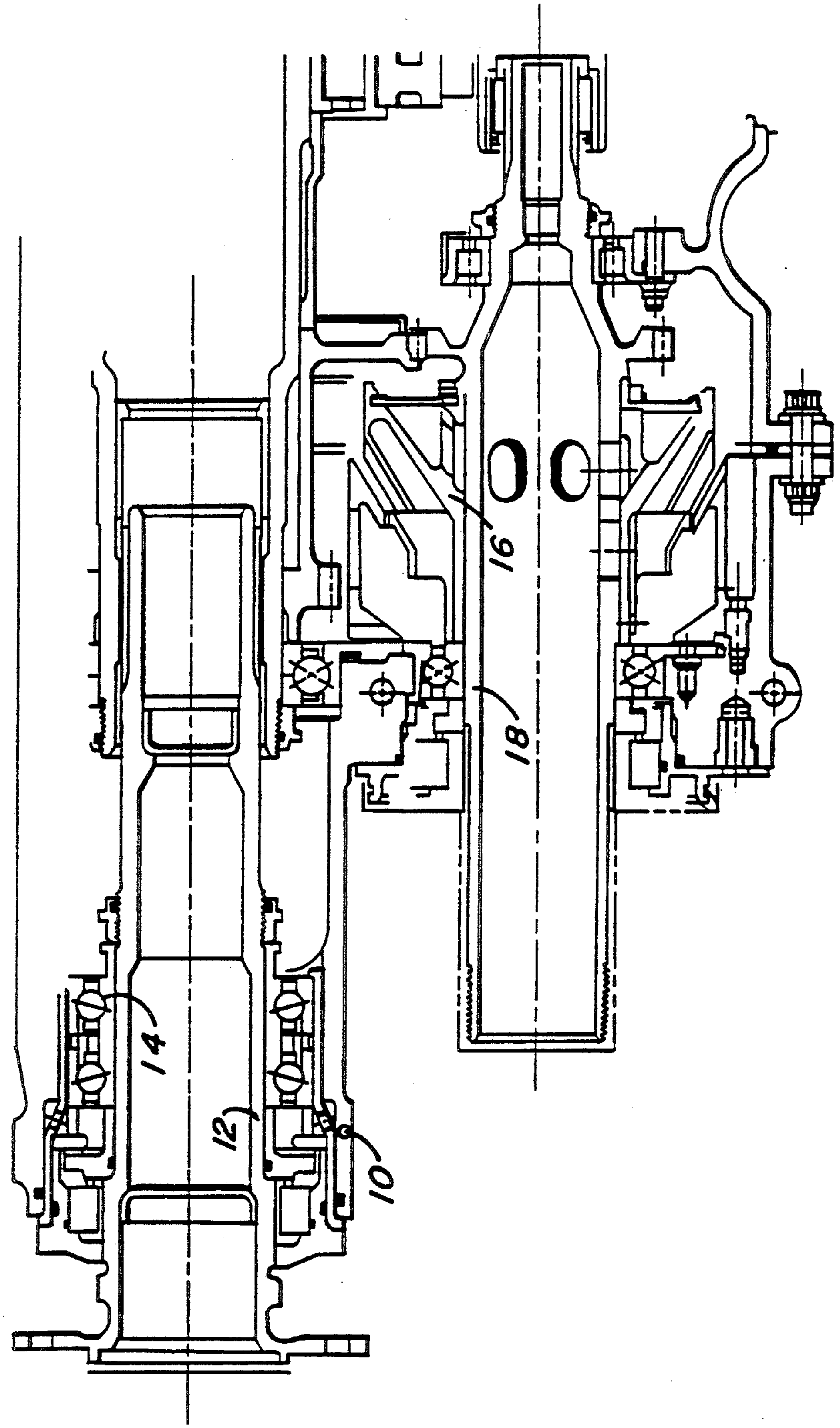
FIG. 1 is a partial section view of a jet engine gearbox showing the deoiler location.

In FIG. 1, gearbox casing 10 contains a plurality of drive shafts such as shaft 12 having bearing 14. Deoiler 16 mounted on and driven by shaft 18 functions to separate the entrained oil from the breather air and thus conserve oil in the lubrication system.

Figure 2:
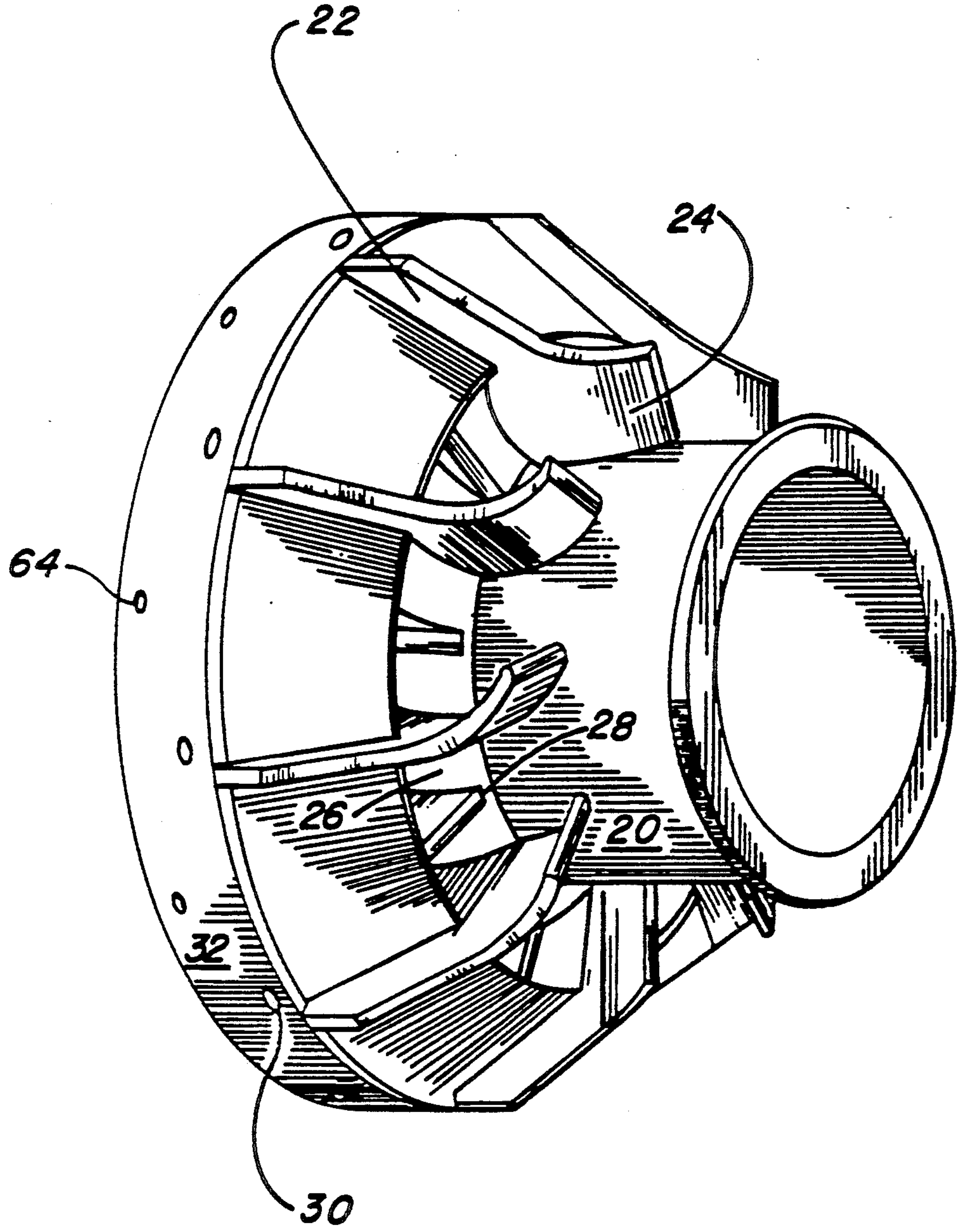
FIG. 2 is a perspective view of a three-stage deoiler in accordance with this invention.

Deoiler 16 is a three-stage deoiler and can be seen in some detail in FIG. 2. Shaft 20 has formed thereon exterior blades 22 which constitute the first stage of the deoiling process. Each blade has cambered inducer 24 in its leading edge portion. The entrance to the second stage is seen at 26 which has a series of laid over blades 28. Oil holes 30 and 64 are provided on outer perimeter 32 of the deoiler housing for the discharge of oil from the second and third stages of the deoiler.

Figure 3:
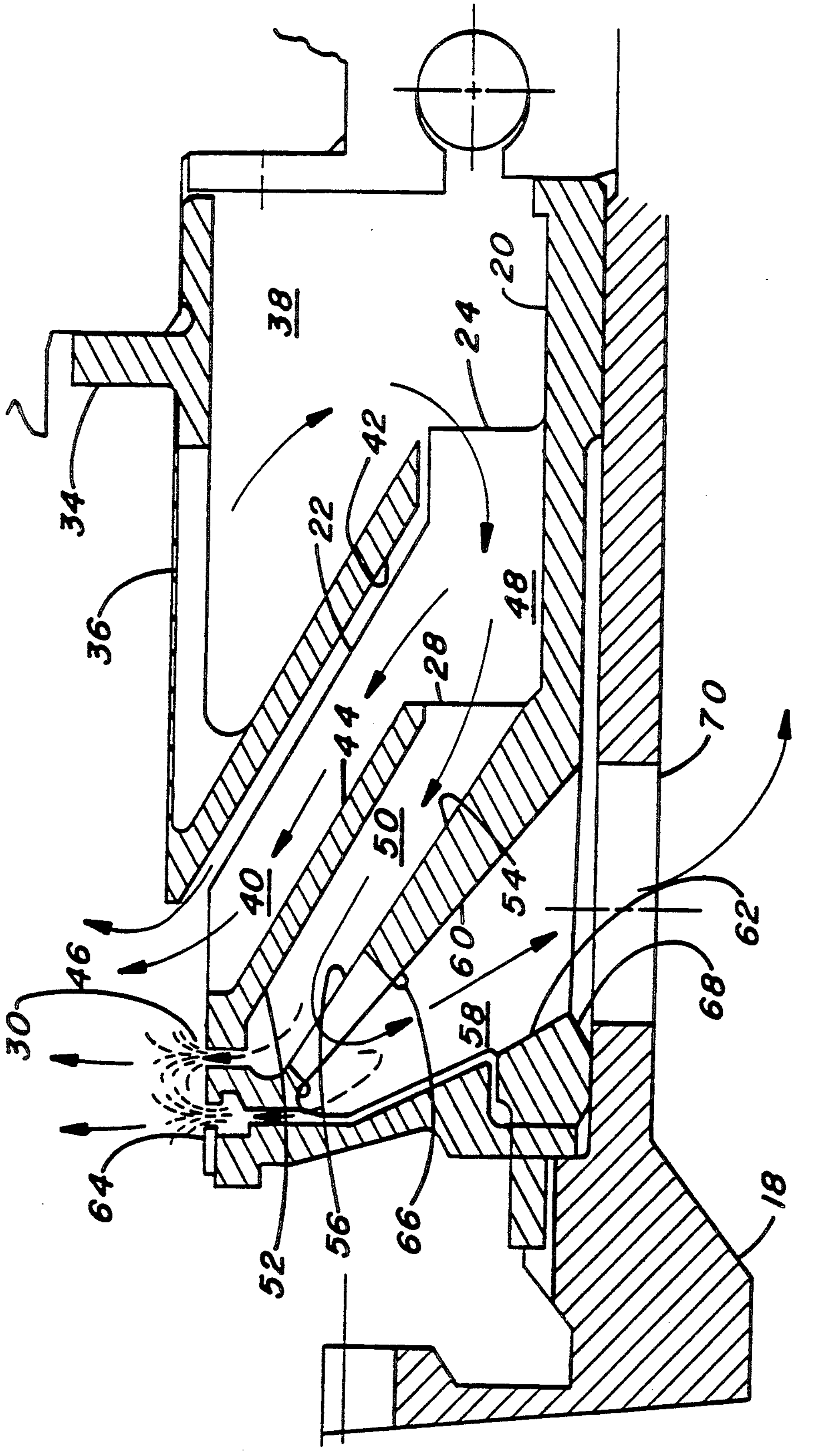
FIG. 3 is a section view of the deoiler of FIG. 2.

The deoiler is seen in greater detail in FIG. 3, a section through the deoiler. The air/oil mixture enters fixed circumferential shroud 34 radially through a single opening 36. The mixture flows radially inwardly through chamber 38 and then turns to flow axially into rotating cambered inducers 24 and exterior blades 22. Impingement and centrifugal force will cause a major portion of the oil particles to flow outwardly between the exterior blades and through passage 40 defined by fixed conical outer wall 42, which is part of shroud 34, and rotating conical inner wall 44. Those oil particles will be discharged to the gearbox through openings 46 between the trailing edges of exterior blades 22. This is the first stage of oil separation of the deoiler.

The air/oil mixture then enters deoiler cavity 48 and flows outwardly between laid over vanes 28 and through passage 50 defined by the blades, conical outer wall 52 and conical inner wall 54. Oil droplets in the mixture are centrifugally separated and discharged into the gearbox through perimeter holes 30. Typically, there is one hole for each passage. This is the second stage of oil separation of the deoiler. The remaining air/oil mixture then passes through geometrically designed windows 56, turning sharply into compartment 58 to flow radially inward between radially extending vanes and through the passage defined by conical outer wall 60 and conical inner wall 62. The compartment provides a last chance for oil separation and oil droplets in the air/oil mixture are pumped radially outward through holes 64 and into the gearbox. Lip 66 around the perimeter of window 56 inhibits oil droplets which have been deposited on conical outer wall 60 from entering windows 56 and tends to direct them to holes 64. This is the third and last stage of oil separation of the deoiler. Oil-free air then exits the deoiler, flowing inwardly through opening 68 and into shaft 18 through a plurality of holes 70.

Figure 4:
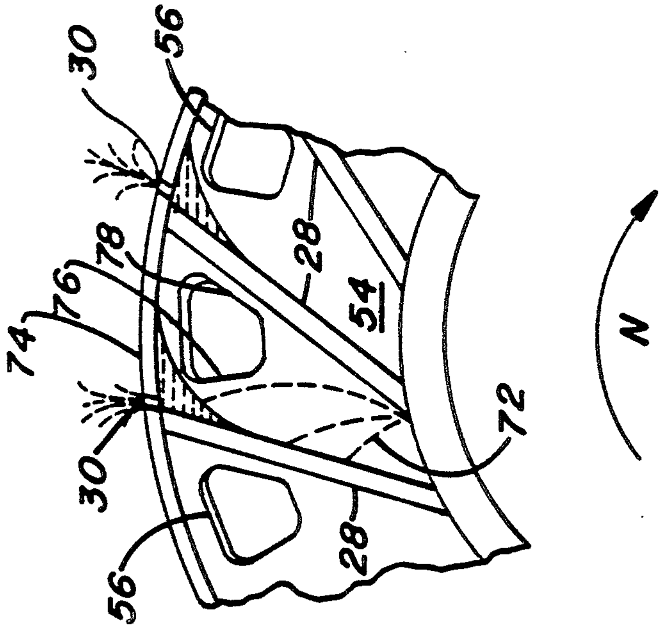
FIG. 4 is a view of the laid over internal vanes of the second deoiling stage showing the air window geometry.

FIG. 4 shows the laid over vanes and special windows of stage 2 in greater detail. Laid over vanes 28 are formed on or applied to the surface of inner wall 54 and partially define passage 50 (FIG. 3) therebetween. The vanes are laid over at an angle of about 30 degrees in the direction of rotation of the deoiler, clockwise in this instance. As the vanes rotate, the weight of the oil droplets combined with the speed and position of the vanes cause the droplets to impinge on the radially inward surface of the vanes and coalesce. The path of the oil droplets is shown by broken lines 72. The separated oil collects where the vanes join perimeter wall 74 and is pumped radially outward by centrifugal force through holes 30 in the wall at the vane junction.

Windows 56 are uniquely designed so as to be out of the major flow path of the oil droplets. By virtue of the laid over vane position, the window geometry may be shaped to allow a larger area for oil droplets to move toward a vane rather than letting the droplets pass through the windows. As shown in FIG. 4, left edge 76 of the windows forms a right or slightly acute angle, so as to be essentially radial, with respect to the top edge of the window along the perimeter. Right edge 78 of the windows forms a relatively large acute angle with respect to the top edge of the window and is essentially parallel to adjacent vanes 28. Thus, as shown in FIG. 4, windows 56 occupy a large area of wall 54 in the upper right hand portion of the area between adjacent vanes 28 for the flow of air therethrough and the left edge of the windows is positioned so as to present as large an area of the wall as possible for the flow of oil droplets to discharge holes 30.

Figure 5:
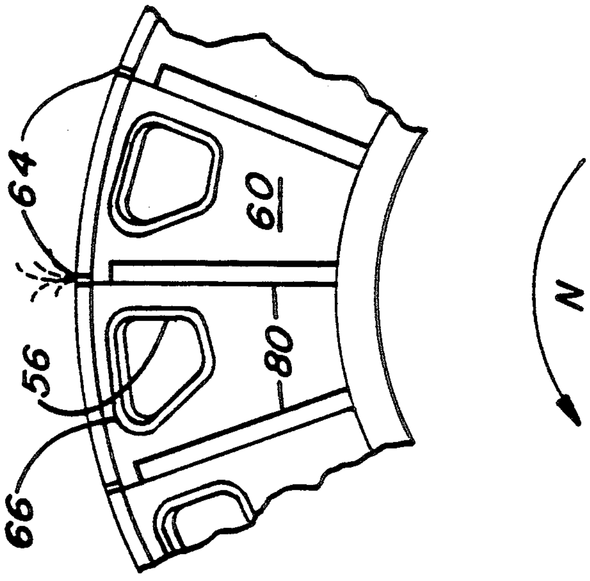
FIG. 5 is a view of the internal vanes of the third deoiling stage, the back side of FIG. 4.

FIG. 5 shows the back side of the deoiler wall between stages 2 and 3. Radially extending vanes 80 are formed on or applied to the surface of outer wall 60 and partially define passages between the vanes in compartment 58 (FIG. 3). The remaining oil droplets entrained in the air in compartment 58, and there should be relatively little by this time along the flow path, are centrifugally deposited on conical outer wall 60 and move radially outward to be centrifugally pumped into the gearbox through holes 64. The perimeter of window 56 on this side of the deoiler wall has lip 66 thereon to prevent oil droplets which have collected on conical outer wall 60 from backflowing through the window.

It should be understood that the invention is not limited to the particular embodiment shown and described herein, but that various changes and modifications may be made without departing from the spirit or scope of this concept as defined by the following claims.

We claim:

1. In a rotating deoiler for a jet engine, said deoiler being installed in an environment of an air/oil mixture and having a housing and passage means for the flow of said mixture therethrough, means for first stage separation of oil from the air including first vanes for centrifugally forcing oil droplets in said mixture outwardly from said deoiler into casing means containing said air/oil mixture, means for second stage separation of oil from the air including second vanes mounted between inner and outer conical walls for centrifugally forcing oil droplets in said air/oil mixture outward through first holes in the perimeter of the deoiler housing, windows in said inner conical wall for the flow therethrough of the air/oil mixture to a third separation stage, and means for third stage separation of oil from the air including third vanes mounted between said second stage vane inner conical wall and a third wall for centrifugally forcing any remaining oil droplets in said air/oil mixture outward through second holes in the perimeter of the deoiler housing, the improvement of the extension of said first vanes along the outer surface of said second vanes outer conical wall and the addition to the leading edge of said first vanes of inducer vanes curved in the direction of rotation of the deoiler.

2. In a rotating deoiler for a jet engine, said deoiler being installed in an environment of an air/oil mixture and having a housing and passage means for the flow of said mixture therethrough, means for first stage separation of oil from the air including first vanes for centrifugally forcing oil droplets in said mixture outwardly from said deoiler into casing means containing said air/oil mixture, means for second stage separation of oil from the air including second vanes mounted between inner and outer conical walls for centrifugally forcing oil droplets in said air/oil mixture outward through first holes in the perimeter of the deoiler housing, windows in said inner conical wall for the flow therethrough of the air/oil mixture to a third separation stage, and means for third stage separation of oil from the air including third vanes mounted between said second stage vane inner conical wall and a third wall for centrifugally forcing any remaining oil droplets in said air/oil mixture outward through second holes in the perimeter of the deoiler housing, the improvement of second vanes mounted so that they are laid over about 30 degrees in the direction of rotation of the deoiler.

3. In a rotating deoiler for a jet engine, said deoiler being installed in an environment of an air/oil mixture and having a housing and passage means for the flow of said mixture therethrough, means for first stage separation of oil from the air including first vanes for centrifugally forcing oil droplets in said mixture outwardly from said deoiler into casing means containing said air/oil mixture, means for second stage separation of oil from the air including second vanes mounted between inner and outer conical walls for centrifugally forcing oil droplets in said air/oil mixture outward through first holes in the perimeter of the deoiler housing, windows in said inner conical wall for the flow therethrough of the air/oil mixture to a third separation stage, and means for third stage separation of oil from the air including third vanes mounted between said second stage vane inner conical wall and a third wall for centrifugally forcing any remaining oil droplets in said air/oil mixture outward through second holes in the perimeter of the deoiler housing, the improvement of second vanes mounted so that they are laid over about 30 degrees in the direction of rotation of the deoiler, windows in said inner conical wall for said second stage contoured with a circumferentially extending outer wall, a side wall substantially parallel and adjacent to a laid over second vane in the direction of rotation and an opposite side wall which is essentially radial in extent.

4. A deoiler for a jet engine, said deoiler being mounted on a rotating drive shaft installed in an environment of an air/oil mixture and having a peripheral housing and passage means for the flow of said mixture therethrough, means for first stage separation of oil from the air including first vanes for centrifugally forcing oil droplets in said mixture outwardly from said deoiler into casing means containing said air/oil mixture, said vanes extending radially outward from a first outer conical wall portion of said deoiler housing and having curved inducer vanes at their leading edge, means for second stage separation of oil from the air including second vanes mounted between said first outer conical wall and an inner conical wall for centrifugally forcing oil droplets in said air/oil mixture outwardly through first holes in the perimeter of the deoiler housing, said second vanes being mounted so that they are laid over in the direction of rotation of the deoiler, windows in said inner conical wall for the flow therethrough of the air/oil mixture to a third separation stage, and means for third stage separation of oil from the air including radially extending third vanes mounted between said second stage vane inner conical wall and a third wall for centrifugally forcing any remaining oil droplets in said air/oil mixture outwardly through second holes in the perimeter of the deoiler housing.

5. A deoiler for a jet engine, said deoiler being mounted on a rotating drive shaft installed in an environment of an air/oil mixture and having a peripheral housing and passage means for the flow of said mixture therethrough, means for first stage separation of oil from the air including first vanes for centrifugally forcing oil droplets in said mixture outwardly from said deoiler into casing means containing said air/oil mixture, said vanes extending radially outward from a first outer conical wall portion of said deoiler housing and having curved inducer vanes at their leading edge, means for second stage separation of oil from the air including second vanes mounted between said first outer conical wall and an inner conical wall for centrifugally forcing oil droplets in said air/oil mixture outwardly through first holes in the perimeter of the deoiler housing, said second vanes being mounted so that they are laid over in the direction of rotation of the deoiler, windows in said inner conical wall for the flow therethrough cf the air/oil mixture to a third separation stage, said windows having an outer wall substantially parallel to the deoiler perimeter, a side wall substantially parallel and adjacent to a laid over vane in the direction of rotation, and an opposite side wall which extends in substantially a radial direction.

6. A deoiler for a jet engine, said deoiler being mounted on a rotating drive shaft installed in an environment of an air/oil mixture and having a peripheral housing and passage means for the flow of said mixture therethrough, means for first stage separation of oil from the air including first vanes for centrifugally forcing oil droplets in said mixture outwardly from said deoiler into casing means containing said air/oil mixture, said vanes extending radially outward from a first outer conical wall portion of said deoiler housing and having curved inducer vanes at their leading edge, means for second stage separation of oil from the air including second vanes mounted between said first outer conical wall and an inner conical wall for centrifugally forcing oil droplets in said air/oil mixture outwardly through first holes in the perimeter of the deoiler housing, said second vanes being mounted so that they are laid over in the direction of rotation of the deoiler, windows in said inner conical wall for the flow therethrough of the air/oil mixture to a third separation stage, said windows having an outer wall substantially parallel to the deoiler perimeter, a side wall substantially parallel and adjacent to a laid over vane in the direction of rotation, and an opposite side wall which extends in substantially a radial direction, the perimeter of the back side of said windows having lip means found thereon.

7. A deoiler for a jet engine, said deoiler being mounted on a rotating drive shaft installed in an environment of an air/oil mixture and having a peripheral housing and passage means for the flow of said mixture therethrough, means for first stage separation of oil from the air including first vanes for centrifugally forcing oil droplets in said mixture outwardly from said deoiler into casing means containing said air/oil mixture, said vanes extending radially outward from a first outer conical wall portion of said deoiler housing and having curved inducer vanes at their leading edge, means for second stage separation of oil from the air including second vanes mounted between said first outer conical wall and an inner conical wall for centrifugally forcing oil droplets in said air/oil mixture outwardly through first holes in the perimeter of the deoiler housing, said second vanes being mounted so that they are laid over about 30 degrees in the direction of rotation of the deoiler, windows in said inner conical wall for the flow therethrough of the air/oil mixture to a third separation stage, said windows having an outer wall substantially parallel to the deoiler perimeter, a side wall substantially parallel and adjacent to a laid over vane in the direction of rotation, and an opposite side wall which extends in substantially a radial direction, a drive shaft on which said deoiler is mounted, and holes in said drive shaft through which air flows to the interior of the shaft after third stage oil separation.

* * * * *